United States Patent [19]

Leiber et al.

[11] Patent Number: 4,804,058
[45] Date of Patent: Feb. 14, 1989

[54] ARRANGEMENT FOR CONTROLLING AT LEAST ONE MAGNITUDE INFLUENCING THE DRIVING TORQUE OF AN INTERNAL COMBUSTION ENGINE OF A MOTOR VEHICLE

[75] Inventors: Heinz Leiber, Oberriexingen; Hans Ohnemueller, Reutlingen; Klaus Kastner, Stuttgart, all of Fed. Rep. of Germany

[73] Assignee: Daimler-Benz Aktiengesellschaft, Stuttgart, Fed. Rep. of Germany

[21] Appl. No.: 136,932

[22] Filed: Dec. 23, 1987

[30] Foreign Application Priority Data

Dec. 23, 1986 [DE] Fed. Rep. of Germany ....... 3644137

[51] Int. Cl.$^4$ ...................... B60K 26/04; B60K 28/16
[52] U.S. Cl. .............................. 180/197; 364/426.01
[58] Field of Search ........... 180/197; 364/426, 431.03; 303/100, 106

[56] References Cited

U.S. PATENT DOCUMENTS

| 4,511,014 | 4/1985 | Makita | 180/197 |
| 4,682,667 | 7/1987 | Hosaka | 180/197 |
| 4,762,196 | 8/1988 | Harada et al. | 180/197 |
| 4,763,262 | 8/1988 | Leiber | 180/197 |

FOREIGN PATENT DOCUMENTS

| 0072395 | 2/1983 | European Pat. Off. |
| 3019562 | 11/1981 | Fed. Rep. of Germany. |
| 3504181 | 8/1985 | Fed. Rep. of Germany. |
| 3408002 | 9/1985 | Fed. Rep. of Germany. |

Primary Examiner—Kenneth R. Rice
Attorney, Agent, or Firm—Barnes & Thornburg

[57] ABSTRACT

An arrangement for the control of at least one magnitude influencing the driving torque of an internal combustion engine of a motor vehicle in conjunction with a drive slippage regulating system is provided with a regulating system which undertakes the follow-up control of this magnitude to a predetermined desired value in steps dependent on vehicle- and outside-dependent magnitudes with an increase velocity also dependent on vehicle and outside, as a result of which excess torques reducing the traction and lateral guidance force are avoided and regulating operations which become necessary are significantly shortened.

20 Claims, 2 Drawing Sheets

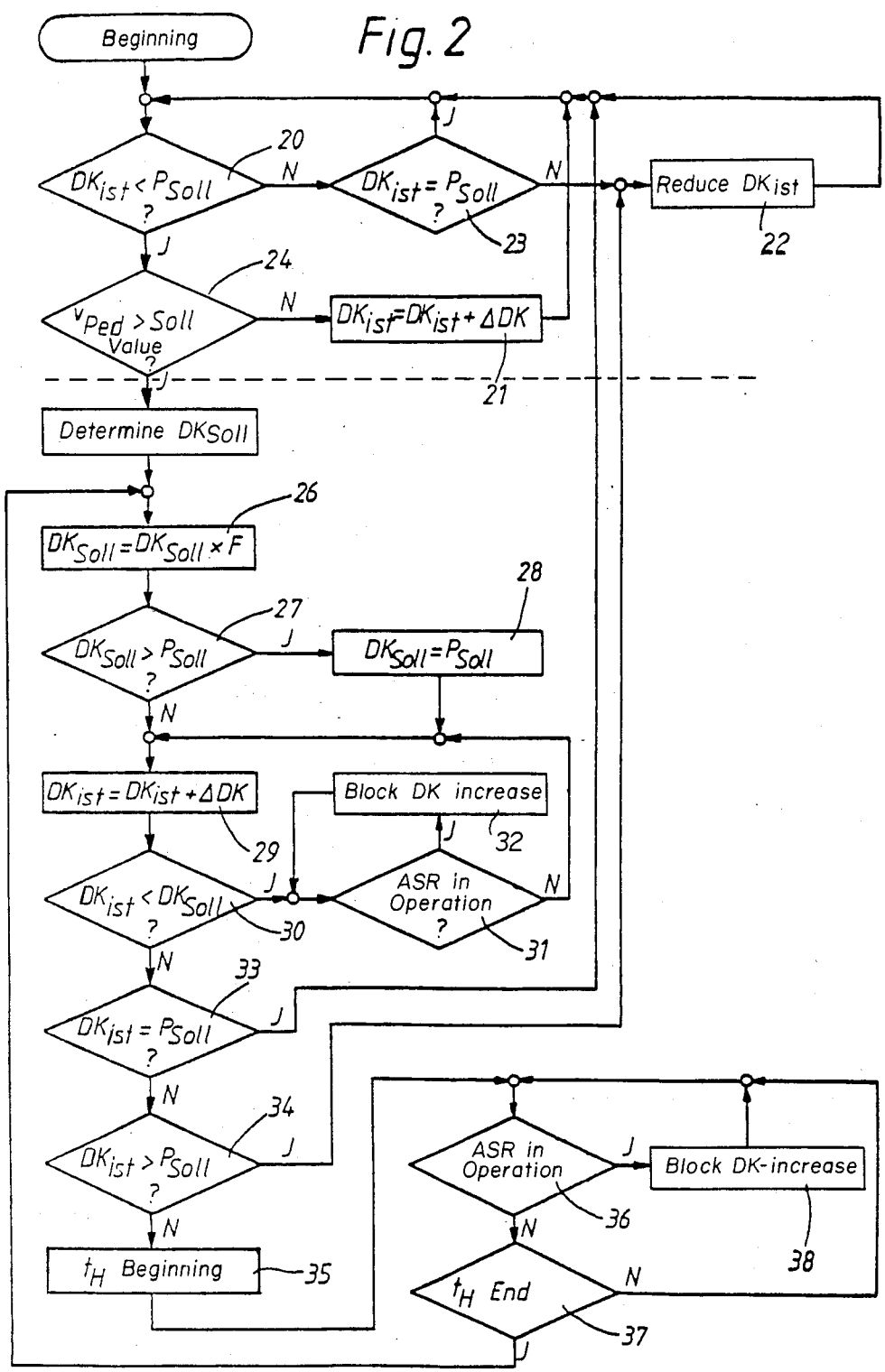

ARRANGEMENT FOR CONTROLLING AT LEAST ONE MAGNITUDE INFLUENCING THE DRIVING TORQUE OF AN INTERNAL COMBUSTION ENGINE OF A MOTOR VEHICLE

BACKGROUND AND SUMMARY OF THE INVENTION

The present invention relates to an arrangement for the control of at least one magnitude influencing the driving torque of an internal combustion engine of a motor vehicle, with a drive pedal and a position transmitter converting the drive pedal position into a desired value signal, with a comparator in which the magnitude to be controlled is compared with the desired value signal and with an adjusting device which produces a signal for increasing the magnitude to be controlled when the desired value signal exceeds the actual value and which produces a signal for reducing the magnitude to be controlled when the desired value signal drops below the actual value.

Such an arrangement is generally referred to as "electronic gas pedal."

An arrangement of this type is disclosed in the DE-OS No. 30 19 562, in which an electronic gas pedal is further expanded in that a function generator is arranged between the gas pedal and the adjusting element acting on the magnitude influencing the driving torque, which specifies a function between gas pedal position and, for example, a throttle valve position dependent on different factors. A fine-feel of the gas pedal corresponding to the respective conditions can be achieved therewith. A sudden adjustment of the gas pedal, for example, up to the full abutment (kick-down) is followed, however, in every case by a complete opening of the throttle valve.

Considerable excess torques result in the driving connection by such a manner of operation which have as a consequence considerable losses, especially in traction and lateral guidance force. Particularly critical and initially non-controllable instabilities of the vehicle behavior occur when steering into a curve with a simultaneous sudden gas pedal depression.

The existing excess torque cannot be reduced in vehicles equipped with regulating systems such as, for example, drive slippage regulation, regulation of the driving stability, etc. by a fast regulating circuit so rapidly that disadvantageous instabilities of the vehicle could be prevented. This is true for all vehicle conditions, beginning, for example, during the start of the drive of the vehicle on ice.

It is the object of the present invention to provide an arrangement which assures that no excessively large excess torques can occur in any operating condition of the vehicle.

The underlying problems are solved according to the present invention in that a further regulating system is provided which initiates a regulating operation when the desired value signal is larger than the actual value of the magnitude to be regulated and at the same time the desired value—increase velocity exceeds a predeterminable desired value which specifies an internal desired value for the magnitude to be regulated coordinated to the vehicle velocity and/or the outside temperature, which causes the actual value to follow the internal desired value with an increase velocity dependent on magnitudes determining the driving torque, which after reaching the internal desired value keeps constant the actual value for a predetermined holding period, which after lapse of the holding period increases the internal desired value by a factor dependent on at least one predetermined influencing magnitude and subsequently again causes a follow-up of the actual value and keeps the same constant for the holding period and repeats these operating steps until the actual value is equal to the desired value signal and therewith the regulating operation is terminated, whereby the regulating operation is interrupted as soon as and as long as the first regulating system (ASR) is active. According thereto, the known "electronic gas pedal" which operates as so-called follow-up control, is expanded by one regulating system which increases the magnitude influencing the driving torque with an increase velocity dependent essentially on the driving torque with continuous monitoring for exceeding predetermined limit values up to the desired value specified by the gas pedal. It is prevented thereby that when exceeding these limit values, an excessively large excess torque results whereby a regulating deviation can be rapidly controlled.

A sole combination of an electronic gas pedal with the regulating system according to the present invention is quite feasible, however, it becomes meaningful only together with a so-called drive slippage regulation which can regulate occurring excess torques that cannot be avoided alone by the driver, before harmful traction and lateral guidance force losses can occur.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 2 is a flow chart of the operation of the arrangements in accordance with the present invention.

DETAILED DESCRIPTION OF THE DRAWINGS

Figure 1:
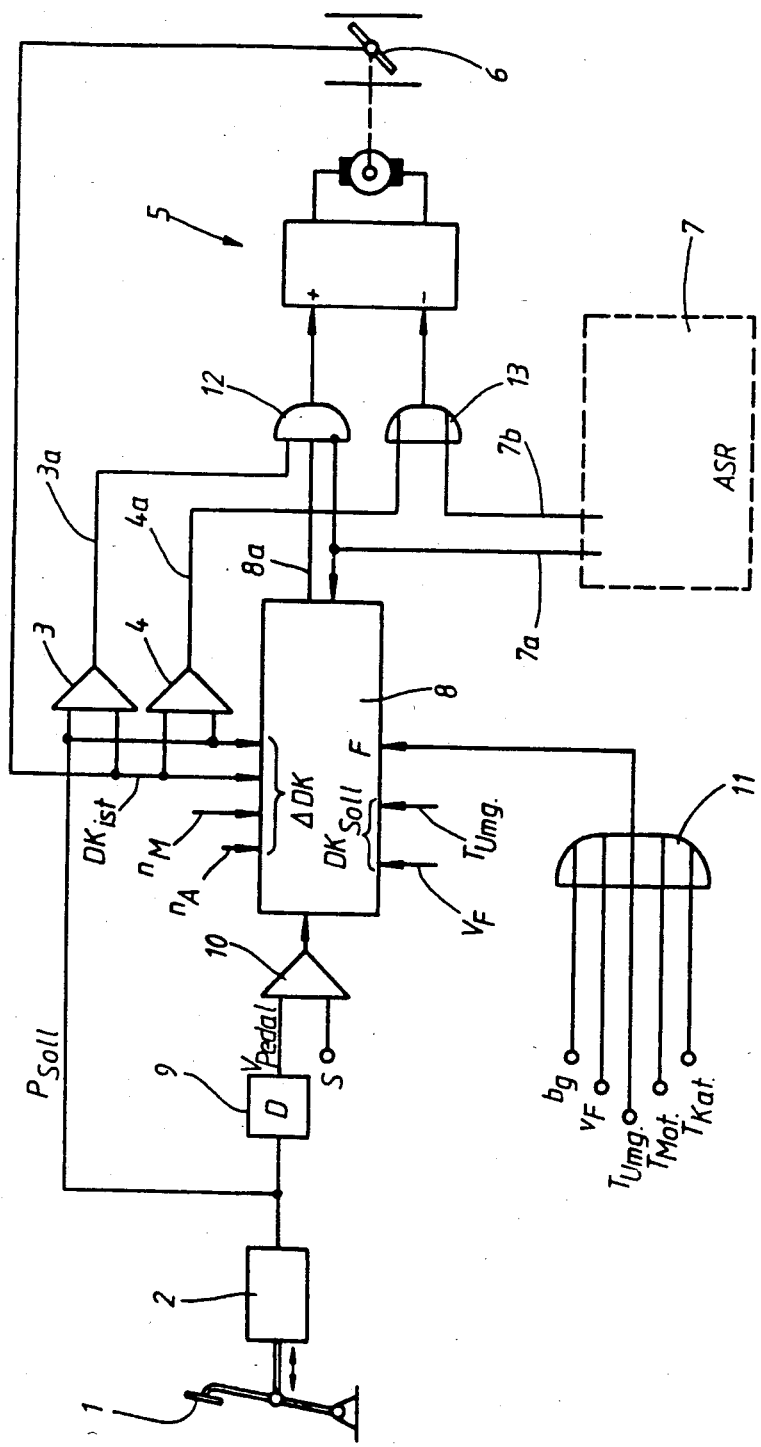
FIG. 1 is a schematic block diagram of an arrangement in accordance with the present invention.

In the embodiment to be described hereinafter, the control, respectively, regulation of the driving torque takes place by way of the adjusting angle of the throttle valve of a carburetor; however, in a similar manner also other magnitudes, for example, the fuel injection quantity or the ignition angle or a combination of such magnitudes can be regulated.

The schematic diagram shown in FIG. 1 illustrates the combination of a regulating installation according to the present invention with an electronic gas pedal and with a drive slippage regulation.

The electronic gas pedal consists of the drive pedal 1 to be actuated by the driver, of a position transmitter or pick-up 2 converting the drive pedal position into an electrical desired value signal $P_{Soll}$ coordinated to the throttle valve-adjusting angle, of a (window-) comparator consisting of two individual comparators 3 and 4 in which the desired value signal $P_{Soll}$ is compared with the actual value $DK_{ist}$ of the adjusting angle of the throttle valve 6 of a carburetor (not shown) of an internal combustion engine and in which an adjusting device 5 for increasing, decreasing or keeping constant the throttle valve adjusting angle is actuated to the comparison result by the output signals 3a and 4a of the comparators corresponding. This electronic gas pedal is a pure follow-up control from the functioning point of view thereof, in which a drive slippage regulation 7 surrounded in dash lines intervenes in the sense of a reduction of the throttle valve adjusting angle when an exceeding of the regulating magnitudes thereof is determined.

The system so far described involve known devices.

A further regulating system 8 is integrated into this known system whose function will be explained hereinafter by reference to the flow diagram illustrated in FIG. 2.

A differentiating element 9 is coordinated to this regulating installation 8 according to the present invention, to which is fed as input signal the desired value signal $P_{Soll}$ and whose output signal represents the adjusting velocity $v_{Pedal}$ of the drive pedal 1. This signal is compared in a comparator 10 with a fixedly predetermined threshold value S.

If the signal $v_{Pedal}$ is larger than this threshold value, then an output signal of the comparator 10 is transmitted to the regulating installation 8 whereupon a regulating operation is initiated in the same. The output signal of the comparator 10 signifies that the drive pedal 1 has been actuated with an adjusting velocity exceeding the threshold value S which is evaluated as sudden gas pedal depression.

Various input magnitudes are fed to the regulating installation 8 which influence the regulating operation. They will be described more fully hereinafter corresponding to their occurrence by reference to the flow chart shown in FIG. 2. The regulating installation 8 can be constructed as special analog or digital circuit or can be realized by a microprocessor with corresponding program. A digital microprocessor solution was selected for the illustrated embodiment.

FIG. 2 illustrates a flow chart for the steps possible during a regulating operation of the regulating installation 8. The flow diagram is divided by a dash line. Essentially a flow diagram of the known "electronic gas pedal" is illustrated above this line whereby the actual value $DK_{ist}$ of the throttle valve angle is caused to follow or track the desired value $P_{Soll}$ specified by the drive pedal. If the actual value is smaller than the desired value, 20, then the actual value is increased stepwise, 21, until both values coincide. If the actual value is larger than the desired value, then the actual value is reduced stepwise, 22, until both values coincide. If the actual value is equal to the desired value, 23, the actual value is kept constant for such length of time until again a difference of the two values is determined.

Together with the actual value—interrogation is determined whether an output signal of the comparator 10 is present, 24, i.e., whether a sudden gas pedal depression with a pedal-adjusting velocity exists that is larger than the threshold value S. In case of the presence of an output signal of the comparator 10, a regulating operation commences in the regulating installation 8.

The first step is the determination of an internal desired value $DK_{Soll}$ of the throttle valve angle, 25. This desired value is determined in dependence on the vehicle velocity $v_F$ and the outside temperature $T_{Umg}$, as is indicated in FIG. 1 in the block representing the regulating installation 8. In the further description, FIGS. 1 and 2 are considered together.

As internal desired value $DK_{Soll}$—which must always be smaller or at most equal to the desired value $P_{Soll}$ specified by the drive pedal 1—will be specified at a vehicle velocity $v_F$ below a predetermined threshold value of about 5 km/h, which is evaluated as starting operation, (a) at an outside temperature $T_{Umg}$ smaller than for example +5° C. (temperature threshold value), a value corresponding to the propulsion torque of the vehicle on icy road and (b) at an outside temperature $T_{Umg}$ larger than +5° C., a value corresponding to the propulsion torque of the vehicle on wet road.

If the vehicle velocity $v_F$ lies above the predetermined threshold value, then the actual value $DK_{ist}$ of the throttle valve angle which exists at the instant of the beginning of the output signal of the comparator 10, is utilized as internal desired value $DK_{Soll}$.

This internal desired value is subsequently increased by a factor F, 26, for example is multiplied with this factor. The factor F which is always greater than "one" is determined in this embodiment for the sake of simplicity as follows:

It has the value of 1.2 when either the vehicle cross acceleration $b_q$ lies within a predetermined range (for example, 0.05 g<$b_q$<0.15 g), or the vehicle velocity $v_F$ lies below a predetermined value (for example, 5 km/h) or the outside temperature $T_{Umg}$ lies below a predetermined value (for example, 0° C.), or the engine temperature $T_{Mot}$ lies below a predetermined value (for example, 20° C.), or the temperature of an exhaust gas catalyst lies below a predetermined value (for example, 80° C.).

For each of the mentioned values a transmitter with a threshold value comparator is provided (not shown in FIG. 1). The output signals of these transmitters are combined by way of an OR-element 11 and are fed to the regulating installation 8. If at least one of the mentioned conditions exists, then an output signal of the OR-element 11 is present whereupon the factor F assumes the value 1.2, otherwise, for example, the value 2.

However, differing from this embodiment, it is also possible to combine each of the instantaneous values of the mentioned magnitudes in proportion to an overall factor.

After an interrogation whether the increased desired value is larger than the desired value $P_{Soll}$ specified by the drive pedal 1, 27, and after an eventual reduction to this value, 28, a follow-up control of the actual value $DK_{ist}$ takes place in steps $\Delta DK$ 29 up to the desired value $DK_{Soll}$ which are determined from the magnitudes of the actual value $DK_{ist}$, the engine rotational speed $n_M$ and the average rotational speed $n_A$ of the driven wheels. These magnitudes are fed to the regulating unit 8, see FIG. 1. An engine performance graph or set of characteristic curves can be represented respectively evaluated from these magnitudes so that each step $\Delta DK$ corresponds to an addition of a predetermined engine torque, whereby taking into consideration the rotational speed ratio of engine and driven axle, the driving torque which is effective at that time can be taken into consideration.

The stepwise adjustment of the throttle valve 6 in the opening direction takes place in that the activation of the adjusting device 5 takes place by a periodic rectangular signal 8a, by means of which both the step height $\Delta DK$ can be specified by means of the pulse duration as also the (average) increase velocity by means of the overall period duration (pulse duration and pulse pause).

This rectangular signal 8a reaches the adjusting device 5 by way of a gate circuit 12 only when an output signal 3a of the comparator 3 exists which signals that the actual value $DK_{ist}$ of the throttle valve angle is smaller than the desired value $P_{Soll}$ specified by the gas pedal 1, and if no signal 7a of the ASR-unit 7 is present, i.e., if no ASR-regulation takes place.

An adjustment of the throttle valve 6 in the closing direction takes place either by way of an output signal 4a of the comparator 4 when the actual value $DK_{ist}$ is larger than the desired value $P_{Soll}$ or, if a signal 7b of the ASR-unit 7 exists. Both signals 4a and 7b reach the adjusting device 5 by way of an OR-element 13. How an increase of the throttle valve angle takes place within an ASR-cycle is not illustrated in detail in FIG. 1.

During the stepwise increase of the throttle valve angle, an interrogation takes place whether the actual value $DK_{ist}$ is still smaller than the desired value $DK_{Soll}$, 30, and whether an ASR-regulation is carried out, 31, during the duration of which any further increase of the throttle valve angle by the regulating installation 8 is blocked, 32.

If the actual value $DK_{ist}$ has become equal in this manner to the drive pedal desired value $P_{Soll}$, then the regulating operation is terminated. If the actual value $DK_{ist}$ has become larger than the desired value $P_{Soll}$, for example, as a result of a retraction of the drive pedal 1, 34, then after a reduction thereof, 22, the regulating operation is also terminated and a return to the "beginning" of the flow diagram takes place.

If after the interrogation step 34 the actual value $DK_{ist}$ (neither equal, 33, nor larger, 34, than the desired value $P_{Soll}$) is smaller than the drive pedal desired value $P_{Soll}$, then the internal desired value $DK_{Soll}$ is reached and a predetermined waiting period $t_H$ of, for example, 200 ms now commences which is matched to the reaction time of the engine to the throttle valve opening, 35. If the drive slippage regulation does not respond within this waiting period $t_H$, 36, 37 (if it does, then as at 37, 32 an opening of the throttle valve is blocked, 36, 38 for such length of time), then subsequently the instantaneous by valid internal desired value $DK_{Soll}$ is anew multiplied with the factor F and the regulating operation again starts in the flow diagram at position 26, etc.

It is achieved in this manner that also with a sudden step-down of the drive pedal up to the abutment, the driving torque is increased exactly so rapidly as the external conditions permit, and a further increase is immediately stopped if instabilities occur that can be detected and regulated by other systems. The necessary regulating durations are shortened thereby and the periods of time of stable driving behavior are lengthened and therewith also the acceleration of the vehicle is improved.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An arrangement for controlling at least one magnitude influencing the driving torque of an internal combustion engine of a motor vehicle, comprising a drive pedal, position transmitter means converting the drive pedal position into a desired value signal, comparator means in which the magnitude to be controlled is compared with the desired value signal, adjusting means which produces a signal for the increase of the magnitude to be controlled when the desired value signal exceeds the actual value and which is operable to produce a signal for reducing the magnitude to be controlled when the desired value signal drops below the actual value, first regulating means which regulates the magnitude influencing the driving torque if the driven wheels of the motor vehicle tend to slip, and second regulating means which is operable to trigger a regulating operation when the desired value signal is larger than the actual value of the magnitude to be regulated and at the same time the desired value-increase velocity exceeds a predeterminable threshold value, said second regulating means being further operable to specify an internal desired value for the magnitude to be regulated coordinated to the driving velocity and/or the outside temperature and causing a follow-up control of the actual value to the internal desired value with an increase velocity dependent on magnitudes determining the driving torque, said second regulating means keeping the actual value constant for a predetermined holding period after reaching the internal desired value and after the lapse of the holding period increasing the internal desired value by a factor depending on at least one predetermined influencing magnitude and subsequently again causing a follow-up of the actual value, keeping the same constant for the holding period and repeating these operating steps until the actual value is equal to the desired value signal and therewith and the regulating operation is terminated, the regulating operation being interrupted as soon and for such length of time as the first regulating means is active.

2. An arrangement according to claim 1, wherein the predeterminable threshold value is a fixed value.

3. An arrangement according to claim 1, wherein the predeterminable threshold value is dependent on the vehicle velocity and the outside temperature.

4. An arrangement according to claim 1, wherein a value is specified as internal starting-desired value which corresponds to the propulsion torque on icy road increased by a predetermined amount, when the vehicle velocity lies below a predetermined vehicle velocity threshold value and the outside temperature lies below a predetermined temperature threshold value.

5. An arrangement according to claim 1, wherein a value is specified as internal starting desired value which corresponds to the propulsion torque on wet road increased by a predetermined amount, when the vehicle velocity lies below a predetermined velocity threshold value and the outside temperature lies above a predetermined temperature threshold value.

6. An arrangement according to claim 1, wherein the actual value increased by a predetermined amount at the instant of the occurrence of the triggering signal is specified as internal starting desired value, when the vehicle velocity lies above a predetermined velocity threshold value.

7. An arrangement according to claim 1, wherein the increase velocity with which the actual value, is caused to follow the desired value is coordinated to the actual value, the engine rotational speed of the internal combustion engine and the rotational speed of the driven wheels of the motor vehicle and is adjusted by a pulse duty factor coordinated thereto of the input signal of the adjusting means.

8. An arrangement according to claim 1, wherein the factor by which the internal desired value is increased, is greater than "one".

9. An arrangement according to claim 8, wherein an influencing magnitude for the selection of the factor is the vehicle cross acceleration whose increase causes a reduction of said factor.

10. An arrangement according to claim 8, wherein an influencing magnitude for the determination of said factor is the vehicle velocity whose increase effects an increase of said factor.

11. An arrangement according to claim 8, wherein an influencing magnitude for the selection of said factor is the outside temperature whose increase effects an increase of said factor.

12. An arrangement according to claim 8, wherein an influencing magnitude for the selection of said factor is the engine temperature whose increase effects an increase of said factor.

13. An arrangement according to claim 8, wherein an influencing magnitude for the selection of said factor is the temperature of a catalyst, below the temperature of which necessary for an orderly function the factor is kept to its minimum value.

14. An arrangement according to claim 4, wherein a value is specified as internal starting desired value which corresponds to the propulsion torque on wet road increased by a predetermined amount, when the vehicle velocity lies below a predetermined velocity threshold value and the outside temperature lies above a predetermined temperature threshold value.

15. An arrangement according to claim 14, wherein the actual value increased by a predetermined amount at the instant of the occurrence of the triggering signal is specified as internal starting desired value, when the vehicle velocity lies above a predetermined velocity threshold value.

16. An arrangement according to claim 9, wherein an influencing magnitude for the determination of said factor is the vehicle velocity whose increase effects an increase of said factor.

17. An arrangement according to claim 16, wherein an infuencing magnitude for the selection of said factor is the outside temperature whose increase effects an increase of said factor.

18. An arrangement according to claim 17, wherein an influencing magnitude for the selection of said factor is the engine temperature whose increase effects an increase of said factor.

19. An arrangement according to claim 18, wherein an influencing magnitude for the selection of said factor is the temperature of a catalyst, below the temperature of which necessary for an orderly function the factor is kept to its minimum value.

20. An arrangement according to claim 8, wherein the increase velocity with which the actual value, is caused to follow the desired value is coordinated to the actual value, the engine rotational speed of the internal combustion engine and the rotational speed of the driven wheels of the motor vehicle and is adjusted by a pulse duty factor coordinated thereto of the input signal of the adjusting means.

* * * * *